United States Patent
Omori

(10) Patent No.: US 12,525,621 B2
(45) Date of Patent: Jan. 13, 2026

(54) FUEL CELL SEPARATOR AND POWER GENERATION CELL

(71) Applicant: HONDA MOTOR CO., LTD., Tokyo (JP)

(72) Inventor: Suguru Omori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 18/125,367

(22) Filed: Mar. 23, 2023

(65) Prior Publication Data
US 2023/0317977 A1 Oct. 5, 2023

(30) Foreign Application Priority Data
Mar. 31, 2022 (JP) ................. 2022-058829

(51) Int. Cl.
*H01M 8/026* (2016.01)
*H01M 8/0263* (2016.01)
*H01M 8/1004* (2016.01)
*H01M 8/1007* (2016.01)

(52) U.S. Cl.
CPC ......... *H01M 8/026* (2013.01); *H01M 8/0263* (2013.01); *H01M 8/1004* (2013.01); *H01M 8/1007* (2016.02)

(58) Field of Classification Search
CPC .. H01M 8/026; H01M 8/1007; H01M 8/1004; H01M 8/0263
See application file for complete search history.

(56) References Cited

FOREIGN PATENT DOCUMENTS

| | | |
|---|---|---|
| JP | 2004-220950 A | 8/2004 |
| JP | 2007-005235 A | 1/2007 |
| JP | 2013-020723 A | 1/2013 |
| JP | 2021-103624 A | 7/2021 |

OTHER PUBLICATIONS

Office Action dated Jan. 9, 2024 issued in the corresponding Japanese Patent Application No. 2022-058829 with the English machine translation thereof.

*Primary Examiner* — Sarah A. Slifka
(74) *Attorney, Agent, or Firm* — Carrier, Shende & Associates P.C.; Joseph P. Carrier; Fulchand P. Shende

(57) ABSTRACT

A second separator (fuel cell separator) of a power generation cell is provided with a second separator body. Second flow field grooves and second flow field protrusions are alternately arranged on the surface of the second separator body. The second flow field protrusions includes first curved convex portions and second curved convex portions alternately arranged in the first direction. The first curved convex portion is formed with a first communication groove communicating with mutually adjacent second flow field grooves, and the second curved convex portion is formed with a second communication groove communicating with mutually adjacent second flow field grooves.

10 Claims, 3 Drawing Sheets

FUEL CELL SEPARATOR AND POWER GENERATION CELL

CROSS-REFERENCE TO RELATED APPLICATIONS

This application is based upon and claims the benefit of priority from Japanese Patent Application No. 2022-058829 filed on Mar. 31, 2022, the contents of which are incorporated herein by reference.

BACKGROUND OF THE INVENTION

Field of the Invention

The present invention relates to a fuel cell separator and a power generation cell.

Description of the Related Art

A power generation cell includes a membrane electrode assembly and a pair of separators arranged on both sides of the membrane electrode assembly. The membrane electrode assembly includes an electrolyte membrane and a pair of electrodes arranged on both sides of the electrolyte membrane.

For example, JP 2021-103624 A discloses a configuration in which concave flow field grooves and convex flow field protrusions for allowing a reactant gas to flow are alternately arranged on a surface of a separator facing an electrode. Communication grooves communicating with adjacent flow field grooves are formed on the protruding end surface of the linearly extending portion of the flow field protrusion.

SUMMARY OF THE INVENTION

According to the prior art described above, since the communication flow field is formed in the linearly extending portion of the flow field protrusion, there are cases in which the reactant gas cannot flow smoothly from the flow field groove to the communication groove.

An object of the present invention is to solve the aforementioned problems.

One aspect of the present invention is a fuel cell separator that includes a plate-shaped separator body stacked on a membrane electrode assembly in which electrodes are arranged on both sides of an electrolyte membrane, wherein a surface of the separator body facing the electrodes is provided with a concave flow field groove that allows a reactant gas to flow along the electrodes in a first direction from one end to another end of the separator body and a convex flow field protrusion, the concave flow field groove and the convex flow field protrusion being alternately arranged in a second direction orthogonal to the first direction, the concave flow field groove and the convex flow field protrusion extend in a wave shape in the first direction, the convex flow field protrusion is formed by a first curved convex portion protruding in the second direction, and a second curved convex portion protruding in a second protruding direction opposite to a first protruding direction, the first curved convex portion and the second curved convex portion being arranged alternately in the first direction, the first curved convex portion is formed with a first communication groove that communicates with the flow field grooves adjacent to each other, and the second curved convex portion is formed with a second communication grooves that communicates with the flow field grooves adjacent to each other.

Another aspect of the present invention is a power generation cell that includes a membrane electrode assembly including an electrolyte membrane and a pair of electrodes arranged on both sides of the electrolyte membrane, and a pair of separators arranged on both sides of the membrane electrode assembly, wherein one of the pair of separators is the fuel cell separator described above.

According to the present invention, because the first curved convex portion is formed with the first communication groove, the reactant gas flowing toward the first curved convex portion in a direction intersecting with the first direction can smoothly flow from the flow field groove to the first communication groove. Further, because the second curved convex portion is formed with the second communication groove, the reactant gas flowing toward the second curved convex portion in a direction intersecting with the first direction can smoothly flow from the flow field groove to the second communication groove. Thus, the reactant gas flowing through the first communication groove and the second communication groove can be supplied to the electrode. In addition, the produced water generated in the portion of the electrode facing the first communication groove and the second communication groove can be discharged into the flow field groove via the first communication groove and the second communication groove.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
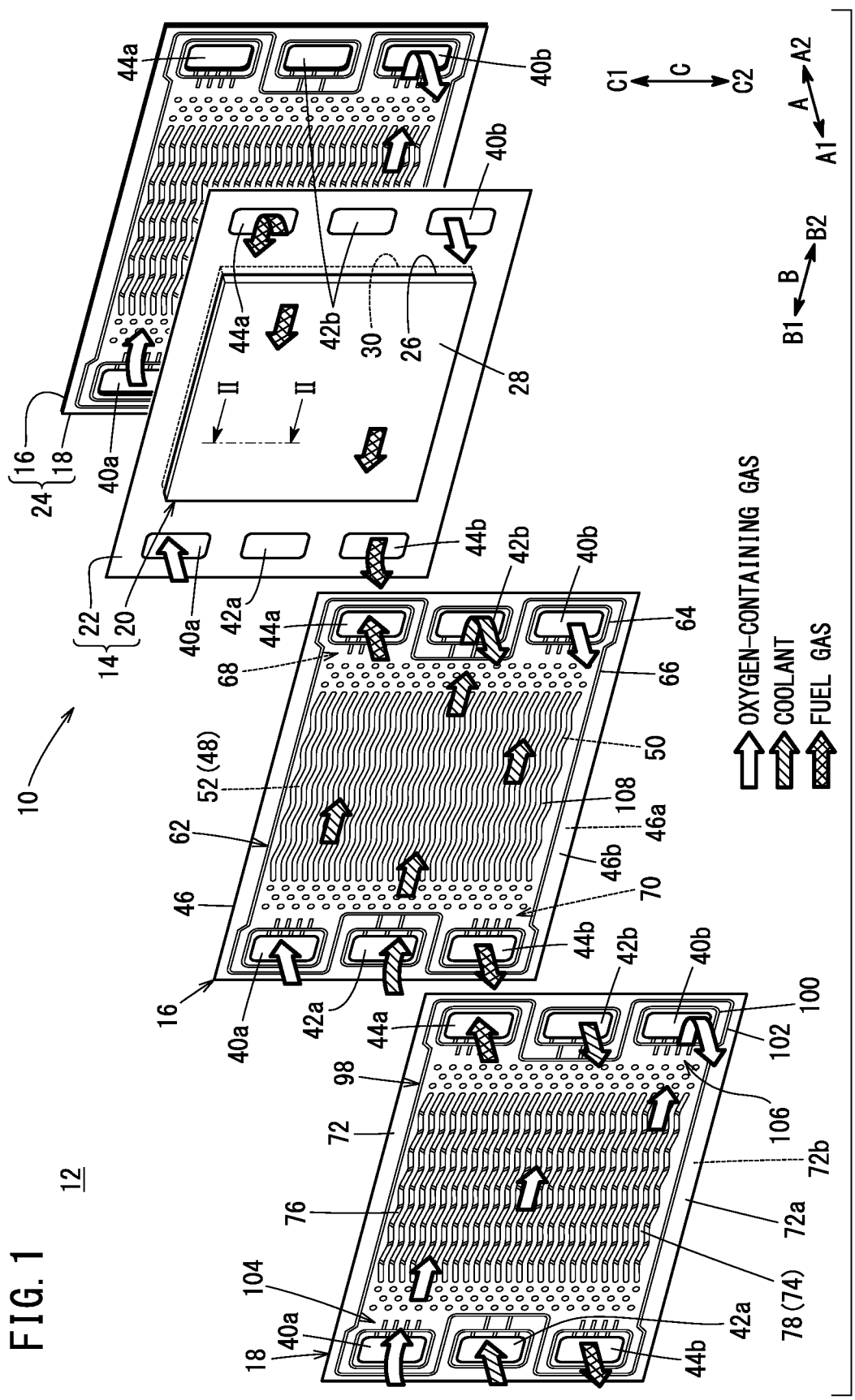
FIG. 1 is a partially omitted exploded perspective view of a fuel cell stack including a power generation cell according to an embodiment of the present invention.

As shown in FIG. 1, a plurality of power generation cells 10 according to an embodiment of the present invention are stacked in the thickness direction (direction of arrow A) to form a fuel cell stack 12. For example, the fuel cell stack 12 is mounted, as a vehicle-incorporated fuel cell stack, in a fuel cell electric vehicle (not shown). The stack direction of the plurality of power generation cells 10 may be either a horizontal direction or a gravity direction.

The power generation cell 10 is formed in a horizontally long rectangular shape. However, the power generation cell 10 may be formed in a vertically long rectangular shape. The power generation cell 10 includes an MEA member 14 (MEA: Membrane Electrode Assembly), a first separator 16, and a second separator 18 (separator for a fuel cell). The MEA member 14 includes an MEA 20 (membrane electrode assembly) and a resin frame member 22 (resin frame portion).

The first separator 16 is disposed on one surface (surface in the direction of arrow A1) of the MEA member 14. The second separator 18 is disposed on the other surface (surface in the direction of arrow A2) of the MEA member 14. The first separator 16 and the second separator 18 sandwich the MEA member 14 in the direction of the arrow A.

The first separator 16 and the second separator 18 are bonded to each other by a plurality of bonding lines (not shown) to form a bonded separator 24. The first separator 16 and the second separator 18 are integrally joined to each other by welding, brazing, caulking or the like on the outer peripheries of the first separator 16 and the second separator 18 while being overlapped with each other.

Figure 2:
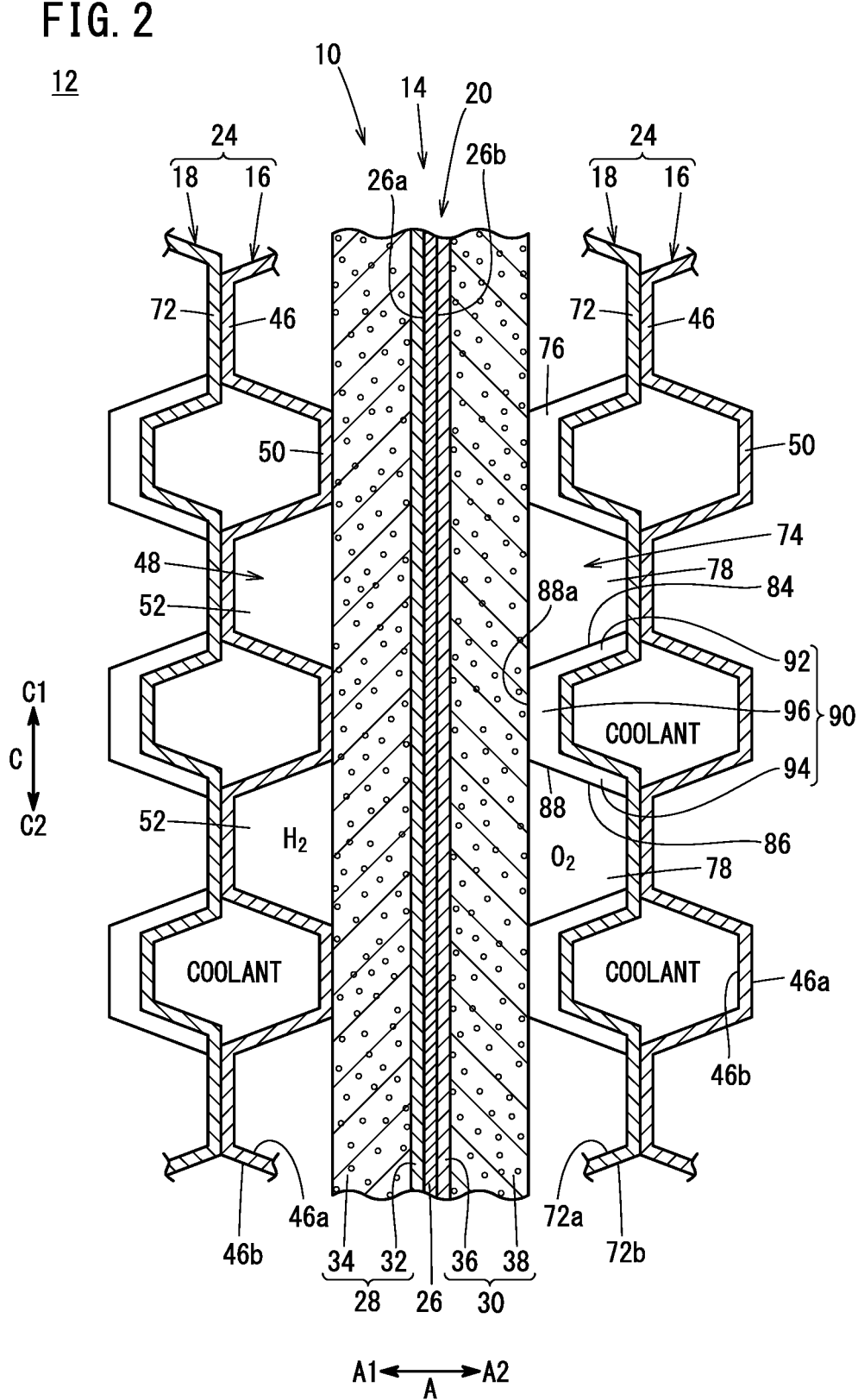
FIG. 2 is a sectional view taken along line II-II in FIG. 1.

In FIG. 2, the MEA 20 generates power through an electrochemical reaction between a fuel gas (one reactant gas) and an oxygen-containing gas (the other reactant gas). The MEA 20 includes an electrolyte membrane 26, an anode 28, and a cathode 30. The electrolyte membrane 26 is, for example, a solid polymer electrolyte membrane (cation exchange membrane). The solid polymer electrolyte membrane is, for example, a thin membrane of perfluorosulfonic acid containing water. As the electrolyte membrane 26, a hydrocarbon (HC)-based electrolyte can be used in addition to a fluorine-based electrolyte. The electrolyte membrane 26 is sandwiched between the anode 28 and the cathode 30.

The anode 28 has a first electrode catalyst layer 32 and a first gas diffusion layer 34. The first electrode catalyst layer 32 is bonded to one surface 26a of the electrolyte membrane 26. The first gas diffusion layer 34 is stacked on the first electrode catalyst layer 32. The first electrode catalyst layer 32 contains, for example, porous carbon particles carrying platinum alloy supported on the surface thereof. The porous carbon particles are uniformly coated on the surface of the first gas diffusion layer 34 together with ionic conductive polymer binders.

The cathode 30 includes a second electrode catalyst layer 36 and a second gas diffusion layer 38. The second electrode catalyst layer 36 is bonded to the other surface 26b of the electrolyte membrane 26. The second gas diffusion layer 38 is stacked on the second electrode catalyst layer 36. The second electrode catalyst layer 36 contains, for example, porous carbon particles carrying platinum alloy supported on the surface thereof. The porous carbon particles are uniformly coated on the surface of the second gas diffusion layer 38 together with ionic conductive polymer binders. Each of the first gas diffusion layer 34 and the second gas diffusion layer 38 is made up from carbon paper, carbon cloth, or the like.

As shown in FIG. 1, the resin frame member 22 is a frame-like sheet that surrounds the outer peripheral portion of the MEA 20. The resin frame member 22 has electrical insulation properties. For example, the resin frame member 22 is made up from PPS (polyphenylene sulfide), PPA (polyphthalamide), PEN (polyethylene naphthalate), PES (polyethersulfone), LCP (liquid crystal polymer), PVDF (polyvinylidene fluoride), silicone resin, fluorine resin, m-PPE (modified polyphenylene ether resin), PET (polyethylene terephthalate), PBT (polybutylene terephthalate), modified polyolefin, and the like.

An oxygen-containing gas supply passage 40a, a coolant supply passage 42a, and a fuel gas discharge passage 44b are provided at one end portion in the long edge direction of the power generation cell 10 (an end portion in the direction of arrow B1). The oxygen-containing gas supply passage 40a, the coolant supply passage 42a, and the fuel gas discharge passage 44b are arranged in the short edge direction (direction of arrow C) of the power generation cell 10.

An oxygen-containing gas flows through the oxygen-containing gas supply passage 40a in the direction of arrow A2. A coolant (for example, pure water, ethylene glycol, oil or the like) flows through the coolant supply passage 42a in the direction of arrow A2. A fuel gas (for example, a hydrogen-containing gas) flows through the fuel gas discharge passage 44b in the direction of arrow A1.

A fuel gas supply passage 44a, a coolant discharge passage 42b, and an oxygen-containing gas discharge passage 40b are provided at the other end portion in the long edge direction of the power generation cell 10 (an end portion in the direction of arrow B2). The fuel gas supply passage 44a, the coolant discharge passage 42b, and the oxygen-containing gas discharge passage 40b are arranged in the direction of arrow C.

The fuel gas flows through the fuel gas supply passage 44a in the direction of arrow A2. The coolant (refrigerant) flows through the coolant discharge passage 42b in the direction of arrow A1. The oxygen-containing gas flows through the oxygen-containing gas discharge passage 40b in the direction of arrow A1.

The arrangement, shape, and size of the passages (the oxygen-containing gas supply passage 40a and the like) described above are not limited to the present embodiment and may be appropriately set according to required specifications.

As shown in FIGS. 1 and 2, the first separator 16 includes a plate-shaped first separator body 46. The first separator body 46 is, for example, a thin metal plate such as a steel plate, a stainless steel plate, or an aluminum plate. The first separator body 46 may be subjected to a surface treatment for corrosion protection. The first separator body 46 is formed in a rectangular shape.

On the surface of the first separator body 46 facing the MEA member 14 (hereinafter referred to as "surface 46a"), a fuel gas flow field 48 extending in the long edge direction (direction of arrow B) of the power generation cell 10 is provided. The fuel gas flow field 48 fluidly communicates with the fuel gas supply passage 44a and the fuel gas discharge passage 44b. The fuel gas flow field 48 supplies fuel gas to the anode 28.

The fuel gas flow field 48 includes a plurality of first flow field grooves 52 formed between a plurality of first flow field protrusions 50 extending in the direction of arrow B. The first flow field protrusions 50 and the first flow field grooves 52 are arranged alternately in the flow field width direction (direction of arrow C). The first flow field protrusions 50 and the first flow field grooves 52 are formed integrally with the first separator body 46 by press molding. The first flow field protrusions 50 are formed to have a trapezoidal or rectangular cross section by the first separator body 46 being press-molded. The first flow field protrusions 50 and the first flow field grooves 52 extend in a wave shape in the direction of arrow B.

In FIG. 1, a first seal portion 62 for preventing leakage of a reactant gas (oxygen-containing gas or fuel gas) or a fluid as a coolant is provided on a surface 46a of the first separator body 46. The first seal portion 62 extends linearly as viewed from the separator thickness direction (direction of arrow A). However, the first seal portion 62 may extend in a wave shape as seen from the separator thickness direction (stacking direction).

The first seal portion 62 is formed to have a trapezoidal or rectangular cross section by the first separator body 46 being press-formed. However, the first seal portion 62 may be a rubber seal. The first seal portion 62 includes a plurality of first passage seal portions 64 and a first flow field seal portion 66. The plurality of first passage seal portions 64 individually surround the plurality of passages (the oxygen-containing gas supply passage 40a and the like). The first flow field seal portion 66 is provided on the outer peripheral portion of the first separator body 46.

The first flow field seal portion 66 surrounding the fuel gas supply passage 44a is provided with a first supply bridge 68 for guiding the fuel gas from the fuel gas supply passage 44a to the fuel gas flow field 48. The first flow field seal portion 66 surrounding the fuel gas discharge passage 44b is provided with a first discharge bridge 70 for guiding the fuel gas having flowed through the fuel gas flow field 48 to the fuel gas discharge passage 44b.

The second separator 18 includes a plate-shaped second separator body 72. The second separator body 72 is, for example, a thin metal plate such as a steel plate, a stainless steel plate, or an aluminum plate. The second separator body 72 may be subjected to a surface treatment for corrosion protection. The second separator body 72 is formed in a rectangular shape.

On a surface (hereinafter referred to as "surface 72a") of the second separator body 72 facing the MEA member 14, an oxygen-containing gas flow field 74 (reactant gas flow field) extending in the long edge direction (direction of arrow B) of the power generation cell 10 is provided. The oxygen-containing gas flow field 74 fluidly communicates with the oxygen-containing gas supply passage 40a and the oxygen-containing gas discharge passage 40b. The oxygen-containing gas flow field 74 supplies the oxygen-containing gas to the cathode 30.

Figure 3:
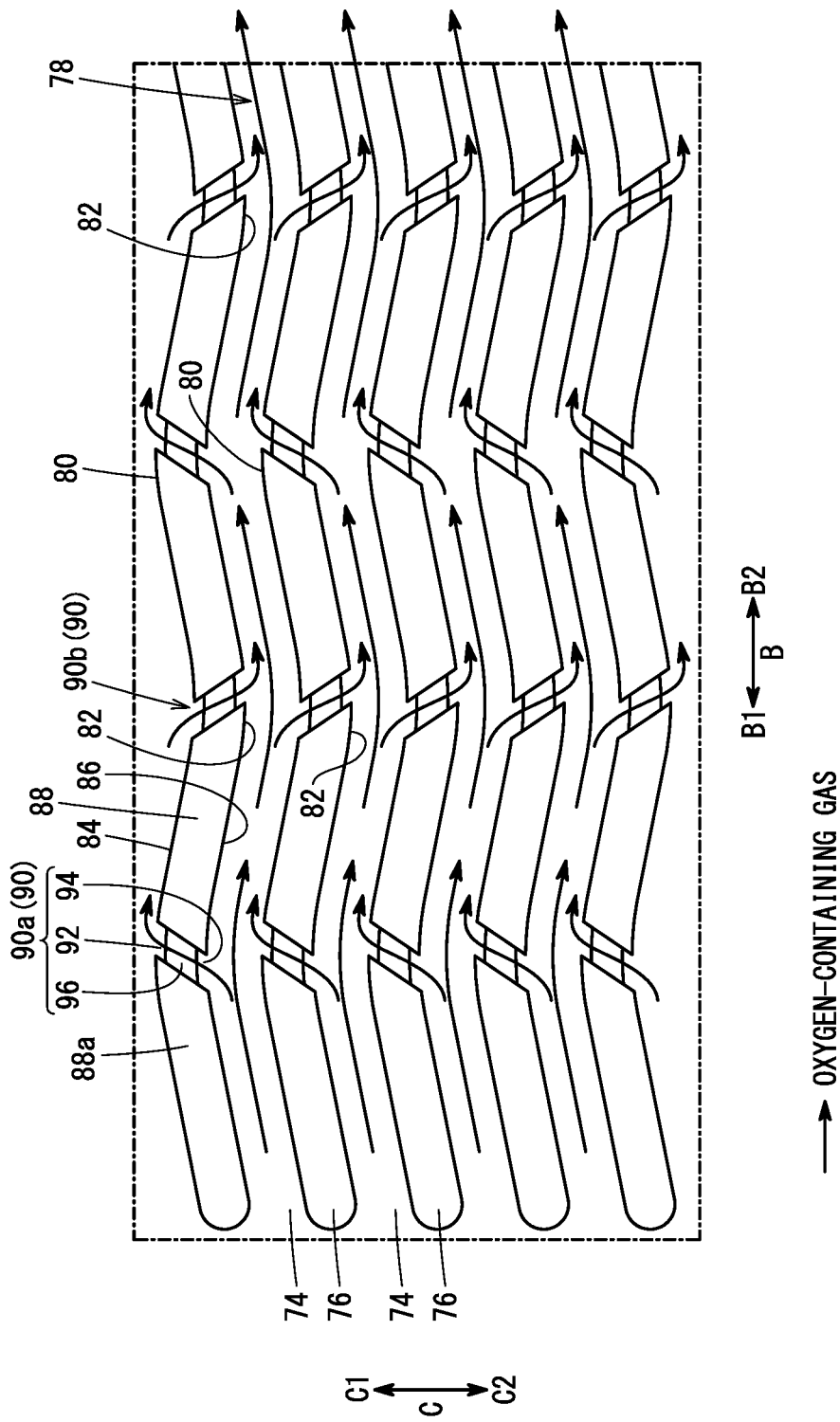
FIG. 3 is a partially enlarged plan view of a second separator shown in FIG. 1.

As shown in FIG. 3, the oxygen-containing gas flow field 74 includes a plurality of second flow field grooves 78 (flow field grooves) formed between a plurality of second flow field protrusions 76 (flow field protrusions) extending in the direction of arrow B. The second flow field groove 78 allows the oxygen-containing gas to flow along the cathode 30 in a first direction (direction of arrow B2) from one end to the other end of the second separator body 72. The second flow field protrusions 76 and the second flow field grooves 78 are alternately arranged in a second direction (direction of arrow C) orthogonal to the first direction. The second flow field protrusion 76 and the second flow field groove 78 extend in a wave shape along the first direction.

The second flow field protrusion 76 is formed by alternately arranging in the first direction first curved convex portions 80 and second curved convex portions 82 protruding in opposite directions. The first curved convex portion 80 protrudes in a first protruding direction (direction of arrow C1). The second curved convex portion 82 protrudes in a second protruding direction (direction of arrow C2) opposite to the first protruding direction.

In FIG. 2, the second flow field groove 78 and the second flow field protrusion 76 are formed integrally with the second separator body 72 by press molding. The second flow field protrusion 76 is formed to have a trapezoidal cross section by the second separator body 72 being press-molded. However, the second flow field protrusion 76 may be formed to have a rectangular cross section by the second separator body 72 being press-formed.

As shown in FIGS. 2 and 3, the second flow field protrusion 76 has a first side wall portion 84, a second side wall portion 86, and a connecting wall portion 88. The first side wall portion 84 and the second side wall portion 86 are arranged to face each other in a flow field width direction (direction of arrow C). The first side wall portion 84 and the second side wall portion 86 protrude toward the cathode 30. The first side wall portion 84 and the second side wall portion 86 are inclined toward to each other in the direction of arrow A1 (see FIG. 2). The connecting wall portion 88 connects the protruding end of the first side wall portion 84 and the protruding end of the second side wall portion 86 to each other. The connecting wall portion 88 has a flat protruding end face 88a that abuts the cathode 30.

As shown in FIG. 3, the first curved convex portion 80 is formed with a first communication groove 90a to communicate with the second flow field groove 78 adjacent to each other. The second curved convex portion 82 is formed with a second communication groove 90b to communicate with the second flow field groove 78 adjacent to each other. The first communication groove 90a is inclined in the first direction (direction of arrow B2) toward the first protruding direction (direction of arrow C1). The second communication groove 90b is inclined in the first direction (direction of arrow B2) toward the second protruding direction (direction of arrow C2). Hereinafter, the first communication groove 90a and the second communication groove 90b may be simply referred to as "communication groove 90".

The groove width (the length along the direction of arrow B) of the communication groove 90 is narrower than the groove width (the length along the direction of arrow C) of the second flow field groove 78. The groove width of the communication groove 90 is constant over the entire length of the communication groove 90. However, the groove width of the communication groove 90 may be equal to or wider than the groove width of the second flow field groove 78. The depth of the communication groove 90 is shallower than that of the second flow field groove 78 (see FIG. 2).

In FIGS. 2 and 3, the communication groove 90 is formed on the first side wall portion 84, the second side wall portion 86 and the connecting wall portion 88. Specifically, the communication groove 90 includes a first concave portion 92, a second concave portion 94, and a third concave portion 96. The first concave portion 92 extends from the root of the first side wall portion 84 (the groove bottom surface of the second flow field groove 78) in the protruding direction of the first side wall portion 84 (direction of arrow A1). The second concave portion 94 extends from the root of the second side wall portion 86 (the groove bottom surface of the second flow field groove 78) in the protruding direction of the second side wall portion 86 (direction of arrow A1). The third concave portion 96 is formed on the connecting wall portion 88. The third concave portion 96 connects the first concave portion 92 and the second concave portion 94 to each other. The communication groove 90 is formed integrally with the second separator body 72 by the second separator body 72 being press-formed.

In FIG. 1, a second seal portion 98 for preventing leakage of a reactant gas (oxygen-containing gas or fuel gas) or a fluid as a coolant is provided on a surface 72a of the second separator body 72. The second seal portion 98 extends straight in the separator thickness direction (direction of arrow A). However, the second seal portion 98 may extend in a wave shape as seen from the separator thickness direction (stacking direction).

The second seal portion 98 is formed to have a trapezoidal or rectangular cross section by the second separator body 72 being press-formed. However, the second seal portion 98 may be a rubber seal. The second seal portion 98 includes a plurality of second communicating hole seal portions 100 and a second flow field seal portion 102. The plurality of second communicating hole seal portions 100 individually surround the plurality of communicating holes (oxygen-containing gas supply passages 40a or the like). The second flow field seal portion 102 is provided on the outer peripheral portion of the second separator body 72.

The second flow field seal portion 102 surrounding the oxygen-containing gas supply passage 40a is provided with a second supply bridge 104 for guiding the oxygen-containing gas from the oxygen-containing gas supply passage 40a to the oxygen-containing gas flow field 74. The second flow field seal portion 102 surrounding the oxygen-containing gas discharge passage 40b is provided with a second discharge bridge 106 for guiding the oxygen-containing gas that has passed through the oxygen-containing gas flow field 74 to the oxygen-containing gas discharge passage 40b.

Between the surface 46b of the first separator body 46 and the surface 72b of the second separator body 72, which are joined to each other, a coolant flow field 108 that is fluidly in communication with the coolant supply passage 42a and the coolant discharge passage 42b is formed.

The power generation cell 10, which is configured as described above, operates in the following manner.

First, as shown in FIG. 1, the fuel gas is supplied to the fuel gas supply passage 44a. The oxygen-containing gas is supplied to the oxygen-containing gas supply passage 40a. The coolant is supplied to the coolant supply passage 42a.

The fuel gas is introduced into the fuel gas flow field 48 of the first separator 16 from the fuel gas supply passage 44a through the first supply bridge 68. The fuel gas is supplied to the anode 28 of the MEA 20 while flowing through the fuel gas flow field 48 in the direction of arrow B1.

On the other hand, the oxygen-containing gas is introduced into the second flow field groove 78 of the oxygen-containing gas flow field 74 of the second separator 18 from the oxygen-containing gas supply passage 40a via the second supply bridge 104. The oxygen-containing gas is supplied to the cathode 30 of the MEA 20 while flowing in the second flow field groove 78 in the direction of arrow B2.

At this time, as shown in FIG. 3, the oxygen-containing gas also flows into the communication groove 90 (first communication groove 90a and second communication groove 90b) while flowing through the second flow field groove 78. The oxygen-containing gas is supplied to the cathode 30 of the MEA 20 while flowing through the communication groove 90. Thus, the oxygen-containing gas can be supplied to the cathode 30 more efficiently than a case where the second separator body 72 is not provided with the communication groove 90 (the oxygen-containing gas is allowed to flow only through the second flow field groove 78).

At the MEA 20, a fuel gas supplied to the anode 28 and an oxygen-containing gas supplied to the cathode 30 are consumed by electrochemical reactions in the first electrode catalyst layer 32 and the second electrode catalyst layer 36. As a result, power is generated. At this time, protons are generated at the anode 28, and the protons pass through the electrolyte membrane 26 and move to the cathode 30. On the other hand, at the cathode 30, water is generated by protons, electrons, and oxygen in the oxygen-containing gas.

Next, as shown in FIG. 1, the fuel gas supplied to the anode 28 and partially consumed is discharged as fuel off-gas from the fuel gas flow field 48 through the first discharge bridge 70 to the fuel gas discharge passage 44b. The oxygen-containing gas consumed at the cathode 30 is discharged as oxygen-containing off-gas from the oxygen-containing gas flow field 74 through the second discharge bridge 106 to the oxygen-containing gas discharge passage 40b.

The water (produced water) produced at the cathode 30 is discharged together with the oxygen-containing off-gas. Specifically, the produced water generated at a portion of the cathode 30 facing the second flow field groove 78 flows directly from the cathode 30 into the oxygen-containing gas flow field 74. On the other hand, the produced water generated at a portion of the cathode 30 facing the communication groove 90 is guided to the second flow field groove 78 through the communication groove 90. Thus, it is possible to prevent the produced water from remaining in a part of the cathode 30.

The coolant supplied to the coolant supply passage 42a is introduced into a coolant flow field 108 formed between the first separator 16 and the second separator 18. The coolant flows in the direction of arrow B after being introduced into the coolant flow field 108. After cooling the MEA 20, the coolant is discharged from the coolant discharge passage 42b.

The present embodiment provides the following effects.

According to the present embodiment, since the first curved convex portion 80 is formed with the first communication groove 90a, it is possible to allow the oxygen-containing gas flowing toward the first curved convex portion 80 in a direction crossing the first direction (direction of arrow B2) to smoothly flow from the second flow field groove 78 to the first communication groove 90a. Further, since the second curved convex portion 82 is formed with the second communication groove 90b, it is possible to allow the oxygen-containing gas flowing toward the second curved convex portion 82 in a direction crossing the first direction (direction of arrow B2) to smoothly flow from the second flow field groove 78 to the second communication groove 90b. Thus, the oxygen-containing gas flowing through the first communication groove 90a and the second communication groove 90b can be supplied to the cathode 30. In addition, the produced water generated at the portion of the cathode 30 facing the first communication groove 90a and the second communication groove 90b can be discharged into the second flow field groove 78 through the first communication groove 90a and the second communication groove 90b.

The first communication groove 90a is inclined in the first direction toward the first protruding direction. The second communication groove 90b is inclined in the first direction toward the second protruding direction.

According to such a configuration, the oxygen-containing gas can be made to flow more smoothly from the second flow field groove 78 to the first communication groove 90a. Further, the oxygen-containing gas can be made to flow more smoothly from the second flow field groove 78 to the second communication groove 90b.

The depth of each of the first communication groove 90a and the second communication groove 90b is shallower than that of the second flow field groove 78.

According to such a configuration, a decrease in rigidity of the second flow field protrusion 76 can be suppressed as compared with a case where the groove depth of each of the first communication groove 90a and the second communication groove 90b is made equal to the groove depth of the second flow field groove 78.

The second flow field protrusion 76 has the first side wall portion 84, the second side wall portion 86, and the connecting wall portion 88. The first side wall portion 84 and the second side wall portion 86 protrude toward the cathode 30 and are arranged to face each other in the second direction. The connecting wall portion 88 connects the protruding end of the first side wall portion 84 and the protruding end of the second side wall portion 86 to each other. Each of the first communication groove 90a and the second communication groove 90b includes the first concave portion 92, the second concave portion 94, and the third concave portion 96. The first concave portion 92 extends from the root of the first side wall portion 84 in the protruding direction of the first side wall portion 84. The second concave portion 94 extends from the root of the second side wall portion 86 in the protruding direction of the second side wall portion 86. The third concave portion 96 is provided for the connecting wall portion 88 to connect the first concave portion 92 and the second concave portion 94 to each other.

According to such a configuration, the oxygen-containing gas flowing near the bottom surface of the second flow field groove 78 can smoothly flow from the first concave portion 92 (or the second concave portion 94) toward the third concave portion 96. In addition, the produced water discharged from the cathode 30 to the third concave portion 96 can be guided from the third concave portion 96 to the groove bottom surface of the second flow field groove 78 (a position apart from the cathode 30) via the second concave portion 94 (or the first concave portion 92).

The second flow field groove 78, the second flow field protrusion 76, the first communication groove 90a, and the second communication groove 90b are formed integrally with the second separator body 72 by the second separator body 72 being press-formed.

With such a configuration, the second separator 18 can be easily manufactured.

The present invention is not limited to the above-described embodiments, and various configurations can be adopted therein without departing from the essence and gist of the present invention.

The present embodiments disclose the following contents.

Disclosed is a fuel cell separator (18) including a plate-shaped separator body (72) stacked on an membrane electrode assembly (20) in which electrodes (28, 30) are arranged on both sides of an electrolyte membrane (26), wherein a surface (72a) of the separator body facing the electrodes is provided with a concave flow field groove (78) that allows a reactant gas to flow along the electrodes in a first direction from one end to the another end of the separator body and a convex flow field protrusion (76), the concave flow field groove and the convex flow field protrusion being alternately arranged in a second direction orthogonal to the first direction, the flow field grooves and the flow field protrusions extend in a wave shape in the first direction, the flow field protrusion is formed by a first curved convex portion (80) protruding in the second direction, and a second curved convex portion (82) protruding in a second protruding direction opposite to a first protruding direction, the first curved convex portion (80) and the second curved convex portion (82) being arranged alternately in the first direction, the first curved convex portion (80) is formed with a first communication groove (90a) that communicates with the flow field grooves adjacent to each other, and the second curved convex portion (82) is formed with a second communication groove (90b) that communicates with the flow field grooves adjacent to each other.

In the fuel cell separator, the first communication groove may be inclined in the first direction toward the first protruding direction, and the second communication groove may be inclined in the first direction toward the second protruding direction.

In the fuel cell separator described above, each of the first communication groove and the second communication groove may be shallower than the flow field groove.

In the fuel cell separator, the flow field protrusion includes a first side wall portion (84) and a second side wall portion (86) that protrude toward the electrodes and are arranged to face each other in the second direction, and a connecting wall portion (88) that connects the protruding end of the first side wall portion and the protruding end of the second side wall portion with each other, each of the first communication groove and the second communication groove include a first concave portion (92) that extends from the root of the first side wall portion in the protruding direction of the first side wall portion, a second concave portion (94) that extends from the root of the second side wall portion in the protruding direction of the second side wall portion, and a third concave portion (96) that is provided for the connecting wall portion and connects the first concave portion and the second concave portion with each other.

In the fuel cell separator described above, the flow field grooves, the channel protrusions, the first communication grooves, and the second communication grooves may be formed integrally with the separator body by the separator body being press-molded.

The above embodiment discloses a power generation cell (10) that includes a membrane electrode assembly including an electrolyte membrane and a pair of electrodes arranged on both sides of the electrolyte membrane, and a pair of separators (16, 18) arranged on both sides of the membrane electrode assembly, wherein one of the pair of separators is the fuel cell separator described above.

The invention claimed is:

1. A fuel cell separator comprising a plate-shaped separator body stacked on a membrane electrode assembly in which electrodes are arranged on both sides of an electrolyte membrane,
   wherein
   a surface of the separator body facing the electrodes is provided with a concave flow field groove that allows a reactant gas to flow along the electrodes in a first direction from one end to another end of the separator body and a convex flow field protrusion, the concave flow field groove and the convex flow field protrusion being alternately arranged in a second direction orthogonal to the first direction,
   the flow field groove and the flow field protrusion extend in a wave shape in the first direction,
   the flow field protrusion is formed by a first curved convex portion protruding in the second direction and a second curved convex portion protruding in a second protruding direction opposite to a first protruding direction of the first curved convex portion, the first curved convex portion and the second curved convex portion being arranged alternately in the first direction,
   the first curved convex portion is formed with a first communication groove that communicates with the flow field grooves adjacent to each other, and
   the second curved convex portion is formed with a second communication groove that communicates with the flow field grooves adjacent to each other.

2. The fuel cell separator according to claim 1,
   wherein
   the first communication groove is inclined in the first direction toward the first protruding direction, and
   the second communication groove is inclined in the first direction toward the second protruding direction.

3. The fuel cell separator according to claim 1, wherein each of the first communication groove and the second communication groove is shallower than the flow field groove.

4. The fuel cell separator according to claim 3,
   wherein
   the flow field protrusion includes
     a first side wall portion and a second side wall portion that protrude toward the electrodes and are arranged to face each other in the second direction, and a connecting wall portion that connects a protruding end of the first side wall portion and a protruding end of the second side wall portion to each other, each of the first communication groove and the second communication groove includes
- a first concave portion that extends from a root of the first side wall portion in a protruding direction of the first side wall portion,
- a second concave portion that extends from a root of the second side wall portion in a protruding direction of the second side wall portion, and
- a third concave portion that is provided to the connecting wall portion and connects the first concave portion and the second concave portion to each other.

5. The fuel cell separator according to claim 1, wherein the flow field groove, the flow field protrusion, the first communication groove, and the second communication groove are formed integrally with the separator body by the separator body being press-molded.

6. A power generation cell comprising
a membrane electrode assembly including an electrolyte membrane and a pair of electrodes arranged on both sides of the electrolyte membrane, and
a pair of separators arranged on both sides of the membrane electrode assembly,
wherein one of the pair of separators is a fuel cell separator comprising
a plate-shaped separator body stacked on a membrane electrode assembly in which electrodes are arranged on both sides of an electrolyte membrane,
wherein
a surface of the separator body facing the electrodes is provided with a concave flow field groove that allows a reactant gas to flow along the electrodes in a first direction from one end to another end of the separator body and a convex flow field protrusion, the concave flow field groove and the convex flow field protrusion being alternately arranged in a second direction orthogonal to the first direction,
the flow field groove and the flow field protrusion extend in a wave shape in the first direction,
the flow field protrusion is formed by a first curved convex portion protruding in the second direction and a second curved convex portion protruding in a second protruding direction opposite to a first protruding direction of the first curved convex portion, the first curved convex portion and the second curved convex portion being arranged alternately in the first direction,
the first curved convex portion is formed with a first communication groove that communicates with the flow field grooves adjacent to each other, and
the second curved convex portion is formed with a second communication groove that communicates with the flow field grooves adjacent to each other.

7. The power generation cell according to claim 6, wherein
the first communication groove is inclined in the first direction toward the first protruding direction, and
the second communication groove is inclined in the first direction toward the second protruding direction.

8. The power generation cell according to claim 6, wherein
each of the first communication groove and the second communication groove is shallower than the flow field groove.

9. The power generation cell according to claim 8, wherein
the flow field protrusion includes
- a first side wall portion and a second side wall portion that protrude toward the electrodes and are arranged to face each other in the second direction, and
- a connecting wall portion that connects a protruding end of the first side wall portion and a protruding end of the second side wall portion to each other, each of the first communication groove and the second communication groove includes
- a first concave portion that extends from a root of the first side wall portion in a protruding direction of the first side wall portion,
- a second concave portion that extends from a root of the second side wall portion in a protruding direction of the second side wall portion, and
- a third concave portion that is provided to the connecting wall portion and connects the first concave portion and the second concave portion to each other.

10. The power generation cell according to claim 6, wherein
the flow field groove, the flow field protrusion, the first communication groove, and the second communication groove are formed integrally with the separator body by the separator body being press-molded.

* * * * *